United States Patent [19]

Van Dalen et al.

[11] Patent Number: 5,264,597
[45] Date of Patent: Nov. 23, 1993

[54] PROCESS FOR REFINING GLYCERIDE OIL USING PRECIPITATED SILICA

[75] Inventors: Josef P. Van Dalen, Maartensdijk; Jannes G. Lammers, Nieuwekerk a/d IJssel, both of Netherlands; Derek Aldcroft, Great Sutton, Great Britain

[73] Assignee: Van den Bergh Foods, Co., Division of Conopco, Inc., Lisle, Ill.

[21] Appl. No.: 899,115

[22] Filed: Jun. 15, 1992

Related U.S. Application Data

[63] Continuation of Ser. No. 414,974, Sep. 29, 1989, abandoned.

[30] Foreign Application Priority Data

Sep. 30, 1988 [GB] United Kingdom ............... 8823006

[51] Int. Cl.$^5$ ................................................. C11B 3/10
[52] U.S. Cl. ..................................... 554/191; 554/196
[58] Field of Search ............................... 554/191, 196

[56] References Cited

U.S. PATENT DOCUMENTS

| | | | |
|---|---|---|---|
| 4,049,686 | 9/1977 | Ringers et al. | 260/424 |
| 4,629,588 | 12/1986 | Welsh et al. | 260/428 |
| 4,880,574 | 11/1989 | Welsh | 260/410.7 |

FOREIGN PATENT DOCUMENTS

| | | |
|---|---|---|
| 269173 | 6/1988 | European Pat. Off. |
| 2168373 | of 0000 | United Kingdom |

*Primary Examiner*—Paul J. Killos
*Assistant Examiner*—D. D. Carr
*Attorney, Agent, or Firm*—Cushman, Darby & Cushman

[57] ABSTRACT

The invention relates to a process for refining glyceride oil comprising the steps of contacting the oil with amorphous silica, wherein said silica is selected from the group of precipitated amorphous silicas having a surface area of at least 400 m$^2$/g in pores with a diameter from at least 2 nm. Preferably said precipitated amorphous silicas have a pore volume in the range of about 1.3 to 2.5 ml/g, in pores having a pore diameter in the range of 3.6 to 1000 nm.

12 Claims, No Drawings

PROCESS FOR REFINING GLYCERIDE OIL USING PRECIPITATED SILICA

This is a continuation application of Ser. No. 07/414,974, filed Sep. 29, 1989, now abandoned.

The present invention relates to a process for refining glyceride oil comprising the step of contacting the oil with amorphous silica.

Glyceride oils of in particular vegetable origin, such as soybean oil, rapeseed oil, sunflower oil, safflower oil, cotton seed oil and the like, are valuable raw materials for the food industries. These oils in crude form are usually obtained from seeds and beans by pressing and/or solvent extraction.

Such crude glyceride oils mainly consist of triglyceride components. However, they generally also contain a significant amount of non-triglyceride components including phosphatides (gums), waxy substances, partial glycerides, free fatty acids, colouring materials and small amounts of metals. Depending on the intended use of the oil, many of these impurities have an undesirable effect on the (storage) stability, taste and colour of later products. It is therefore necessary to refine, i.e. to remove the gums and other impurities from the crude glyceride oils as much as possible.

In general, the first step in the refining of glyceride oils is the so-called degumming step, i.e. the removal of the phosphatides. In conventional degumming processes water is added to the crude glyceride oil to hydrate the phosphatides, which are subsequently removed e.g. by centrifugal separation. Since the resulting degummed oil often still contains unacceptably high levels of 'non-hydratable' phosphatides, this water-degumming step is normally followed by chemical treatments with acid and alkali to remove the residual phosphatides and to neutralize the free fatty acids ('alkali-refining'). Subsequently, the soapstock so formed is separated from the neutralized oil by e.g. centrifugal separation. The resulting oil is then further refined using bleaching and deodorizing treatments.

After the above described water-degumming step in general residual phosphorus levels are achieved in the order of 100-250 ppm. By the improved degumming method as described in U.S. Pat. No. 4,049,686 in which the crude or water-degummed oil is treated with a concentrated acid such as in particular citric acid, residual phosphorus levels can be brought down to within the range of from 20-50 ppm.

In general, the lower the amount of residual phosphatides after the degumming step the better or easier the subsequent refining steps. In particular, a low phosphatide level after degumming results in easier processing in the alkali-refining step or even may open the possibility to avoid the alkali-refining step altogether, in which case the oil is only further refined by means of bleaching and steam-refining. A refining process sequence which does not involve an alkali treatment and subsequent removal of soapstock is often referred to as 'physical refining', and is highly desirable in terms of processing simplicity and yield.

Bleaching or adsorbent-extraction of oils to remove colour or colour-precursors, residual phosphorus, soap and trace metal contaminants is well-known and is a generally applied step in oil refining processes. A variety of adsorbents have been proposed in the prior art, including bleaching earths (hydrated aluminium silicates), such as the natural bleaching earth known as fuller's earth, and acid-activated clays, in particular, acid-treated bentonites or montmorillonites, activated charcoal, silica gels and the like.

In GB 2,168,373 there is described a process for the removal of trace contaminants, such as phospholipids and associated metal ions, which involves the treatment of degummed oil with a suitable amount of amorphous silica. Suitable amorphous silicas are disclosed to have an average pore diameter of at least 6 nm, and may be gels, precipitated, dialytic and fumed. The reported hydrogels have a surface area of at least about 500 $m^2/g$, a pore volume of 1.8 ml/g and an average pore diameter of at least 8 nm. The reported precipitated silicas have a surface area of at most about 200 $m^2/g$, a pore volume in the range of 1.04 to to 1.43 ml/g and an average pore diameter of at least 21 nm.

It has now been found that within the general class of amorphous silicas the precipitated amorphous silicas having the physical characteristics defined hereunder in more detail give particular good results in the removal of residual trace contaminants, for instance phosphatides and associated metals such as iron, from the crude or (partially) degummed oils.

Accordingly, the present invention provides a process for refining glyceride oil comprising the step of contacting the oil with amorphous silica, characterized in that said silica is selected from the group of precipitated amorphous silicas having a surface area of at least 400 $m^2/g$ in pores with a diameter from at least 2 nm.

These precipitated amorphous silicas have an improved phosphorous and iron removal if the surface area in pores having a diameter from at least 2 nm, is in the range of about 400-750 $m^2/g$, and most preferred in the range of about 500-750 $m^2/g$.

The preferred precipitated amorphous silicas have further a pore volume in pores having a diameter from 3.6 to 1000 nm, in the range of about 1.3 to 2.5 ml/g, most preferred 1.4 to 2.3 ml/g. The mean particle size being in the range of about 10 to 40 $\mu m$, preferably about 15 to 35 $\mu m$. The pore diameter is preferably in the range of about 5 to 10 nm.

These precipitated amorphous silicas have a remarkably high structure (high pore volume) for the surface area range defined. The silicas having high surface area contain unreacted hydroxyl groups and consequently contain high structural bound water of at least 5% w/w.

The preferred amorphous silicas of the invention have an oil absorption in the range from 220 to 350 ml/100 g, determined according to the ASTM method identified below.

To avoid counter-acting the adsorbent potential for removing trace metal contaminants it is preferred that the silica to be used in the process of the invention contains less than about 20 ppm w/w of iron releasable during the refining treatment of the oil, which amount represents less than about 30% w/w of the total iron present in the silica, preferably less than about 10% w/w.

Accordingly, a preferred processing feature of the invention is the reduction of the releasable iron content by contacting the silica at a pH from 2 to 7 with an aqueous solution of an appropriate complexing agent which is capable of forming a complex with iron and has a pK of at least about 12, at a mole ratio of complexing agent to iron of from about 3:1, with subsequent separation and washing of the silica. Examples are the tetrasodium salt of ethylene diamine tetraacetic (designated EDTA), nitrilotriacetic acid (NTA) and the trisodium salt of N-hydroxyethyl ethylene diamine triacetic acid (HEEDTA). These complexing agents have pKs of 25.1, 15.9 and 19.8 respectively. The iron complex may be removed in the washing stage of the preparation.

The mean particle size of the silicas is desirably in the range from about 10 to about 40 μm. Although particles below about 10 μm provide desired contaminant removal properties, such relatively small-sized material can cause oil filtration problems. Silicas over the mean particle size of about 40 μm are suitable for oil refining purposes but the larger particle sized materials need longer time in contact with the oil to be effective. Preferably, the mean particle size lies within the range of from 15 to 35 μm.

The free moisture content of the silicas is generally less than about 25% w/w, preferably less than about 20, or even 15% w/w, as these provide optimum cost effectiveness in the refining of oils.

In general, although heavily dependent upon the quality of the oil to be treated, the above-defined silicas will be used at a level of not more than 2% of silica calculated as dry silica by weight of the oil to be treated. In most instances, the level of silica will be in the range of from 0.1 to 1% w/w, levels of 0.2 to 0.8% w/w being preferred for oils containing low to medium phosphorus contents, e.g. water-degummed oils.

A suitable method of preparing the amorphous silicas used in the invention is by reaction of sodium silicate having a $SiO_2:Na_2O$ ratio in the range from about 2.8 to about 3.5:1, with mineral acid, the concentration and volume of the reactants being controlled to give a reaction in the pH range from about 10 to about 10.5, in the presence of a water-soluble electrolyte comprising a cation selected from the group comprising sodium and potassium with an associated anion selected from the group comprising bromide, chloride and nitrate, wherein the electrolyte:silica weight ratio is from about 0.10:1 to about 0.25:1, the precipitation reaction being performed in the temperature range from about 10° C. to about 50° C. and the silicas separated from the reaction medium.

The silicas used in the invention are defined in terms of their physical and chemical properties. The standard test methods used to determine these properties are:

(i) Surface Area:

Surface area is determined by standard nitrogen adsorption methods of Brunauer, Emmett and Teller (BET) using a multipoint method with an Autosorb-6 apparatus supplied by Quantachrome Corp. of the USA. The BET surface area recorded is that occurring over the range of calculated pore diameter of less than 200 nm. The samples were outgassed under vacuum at 270° C. for 1 hour.

Surface area in pores having a pore diameter in the range 2-200 nm was calculated according to E. P. Barrett, L. G. Joyner and P. P. Halenda in J. Am. Chem. Soc., 73, page 373 (1951). The determination of the surface area in pores of a certain size e.g. >2 nm diameter is obtained by measurement of the nitrogen adsorption isotherm (77K). Owing to pore interconnectivity the adsorption isotherm is employed rather than desorption data and the surface area in relation to the pore size distribution is calculated using the assumption of cylindrical pores. A summary of the BET nitrogen adsorption technique is given by S. Lowell and J. E. Shields (in: Powder, Surface Area and Porosity, 2nd edition 1984 edited by B. Scarlett and published by Chapman and Hall, London, Powder Technology Series).

(ii) Oil Absorption:

The oil absorption is determined by the ASTM spatula rub-out method (American Society of Test Material Standards D, 281).

The test is based upon the principle of mixing linseed oil with a silica by rubbing with a spatyla on a smooth surface until a stiff putty-like paste is formed which will not break or separate when it is cut with the spatula. The volume of oil used is then put into the following equation:

$$\text{Oil adsorption} = (cm^3 \text{ oil adsorption} \times 100)/(\text{grams of silica in sample})$$
$$= cm^3 \text{ oil}/100 \text{ g silica}$$

(iii) Volume based median particle diameter:

The volume based median particle diameter herein referred to as weight mean particle size is determined using a laser diffraction technique with the aid of the apparatus Helos of Sympatec with closed-loop cuvette. It is calculated as the volume based median particle diameter D(V50%). The laser used was a 5 mW power He-Ne laser. Before measurement the samples were dispersed in water.

(iv) Electrolyte Levels:

Sulphate is determined gravimetrically by hot water extraction of the silica, followed by precipitation as barium sulphate. Chloride is determined by hot water extraction of the silica, followed by titration with standard silver nitrate solution using potassium chromate as indicator (Mohr's method).

(v) Moisture Loss at 105° C.:

Moisture loss is determined by the loss in weight of a silica when dried to constant weight in an electric oven at 105° C.

(vi) Ignition Loss at 1000° C.:

Ignition loss is determined by the loss in weight of a silica when ignited in a furnace at 1000° C. to constant weight.

(vii) pH:

This measurement is carried out on a 5% w/w suspension of the silica in boiled demineralised water ($CO_2$-free).

(viii) Mean pore diameter (MPD):

This parameter is related to the surface area and pore volume and, using a cylindrical pore model, is calculated for a silica product with the formula:

$$MPD(nm) = (4,000 \times \text{pore volume in ml/g})/(\text{surface area in } m^2/g)$$

(ix) Releasable iron:

In this test a sample of silica is contacted with untreated oil for a given period of time. The oil is filtered and tested for iron content. The difference between the iron content of filtered untreated oil and that of treated oil is back calculated to give the releasable iron content of the silica.

A 5 g sample of the silica under test is weighed out and added to 200 ml of degummed oil at 24°±2° C. in a 1 liter Erlenmeyer flask. The contents of the flask are shaken immediately and then at one minute intervals for 5 minutes. After 5 minutes and 50 seconds of contact the contents are again shaken and immediately filtered using an iron free filter paper. The filtrate collected over the first 30 seconds is discarded and the filtrate collected during the following 2 minutes 30 seconds is taken as the test filtrate.

The filtrate is tested for iron content using a "Fe Aquaquant" test kit, 0.01-0.2 ppm, Art 14403 manufactured by E. Merck, Darmstadt, W. Germany.

A sample of degummed oil filtered through a similar paper to that used for the treated sample is also tested for iron content by the same method.

The result is reported as:

ppm releasable iron = 40 ×(ppm w/w of iron in treated oil − ppm w/w of iron in control oil)

(x) Total iron:

Silica is first removed from the sample as silica tetrafluoride, using hydrofluoric acid.

The residue is dissolved in dilute nitric acid and the total iron is determined by atomic absorption spectroscopy, using standard solutions.

(xi) Mercury intrusion volume:

Mercury intrusion volumes are determined (in ml/g) by standard mercury intrusion procedures in pores having a pore diameter in the range of 3.6-1000 nm, using a Micromeritics Autopore 9220 mercury porosimeter. The pore diameter is calculated from the Washburn equation, using values of surface tension for mercury of 485 dynes/cm and contact angle of 140°.

A summary of the mercury porosimetry technique is given by S. Lowell and J. E. Shields (in: Powder, Surface Area and Porosity, $2^{nd}$ edition 1984 edited by B. Scarlett and published by Chapman and Hall, London, Powder Technology Series). Prior to measurement, the sample was dried in an oven at 120° C. for two hours at atmospheric pressure and then outgassed at room temperature for 15 minutes to a pressure of 50 micrometers of mercury (7 Pascal).

EXAMPLE I

Various examples of the precipitated amorphous silicas according to the invention will now be given to illustrate but not limit the invention.

A heated, stirred reaction vessel was used for the silicate/acid reaction.

The solutions used in the process were:

(i) Sodium silicate solutions having an $SiO_2:Na_2O$ ratio in the range of 3.2 to 3.4:1.

(ii) A sulphuric acid solution of specific gravity 1.11 (16.1% w/w solution) to 1.15 (21.4% w/w solution).

(iii) An electrolyte solution as defined in each example.

The following procedure was adopted in the preparation of the precipitated silicas, values of reactant concentrations and volumes, and reaction temperatures being listed in Table I.

(A) liters of water were placed in the vessel together with (B) liters of electrolyte solution and (C) liters of the sodium silicate solution. This mixture was then stirred and heated to (E) °C.

The sodium silicate (D) (liters) and sulphuric acid (F) (liters) solutions were then added simultaneously over a period of about 20 minutes with stirring while maintaining the temperature at (E) °C. The flow rates of the silicate and acid solutions were uniform throughout the addition period to ensure that a constant pH was maintained in the vessel. Sulphuric acid solution was then added over a period of 10 minutes with continued mixing to reduce the pH of the liquid to the range of 2.0 to 7.0, preferably to 4.5. During this addition of acid the temperature was maintained.

Optionally, at least 0.02% (w/w on $SiO_2$) of a selected complexing agent can be added at this point, if a silica with a low (<20 ppm) level of releasable iron is required. The agent was added to the slurry (pH 2 to 7) and allowed to mix for at least 10 minutes, preferably 20 minutes. This complexing agent treatment was carried out on one silica as shown in the Tables I and II.

The iron-complexing step can alternatively be performed by treating the dried silica with the solution of complexing agent. It has been found that the characteristics of the complexing agent do not have to be as stringent as for the process treatment previously described.

The resultant slurry was then filtered and washed with water to remove excess electrolyte and the water-soluble iron complex when present. Typically, for an oil-refining application, the residual electrolyte would be less than 1% on a dry weight basis.

After washing, the filter cake was flash dried, and depending on the particle size required, the product was either milled and/or classified or used as obtained from the drier. Drying conditions can be modified to obtain silicas having specific free moisture contents i.e., not including structural bound water, within the range of up to 20% w/w.

The precipitated silica obtained had the properties expressed on a dry weight basis, as listed in Table II.

TABLE I

| SILICA N° | 1 | 2 | 3 | 4 |
|---|---|---|---|---|
| Vessel Capacity (liters) | 64 | 325 | 64 | 325 |
| Water Volume (A) (liters) | 22.8 | 116.6 | 23.1 | 121.6 |
| Electrolyte Used | NaCl | NaCl | NaCl | NaCl |
| Concentration of Electrolyte (% w/w) | 25 | 25 | 25 | 25 |
| Volume of Electrolyte (B) (liters) | 3.3 | 8.7 | 2.2 | 11.1 |
| Silicate Ratio $SiO_2/Na_2O$ w/w | 3.25 | 3.31 | 3.23 | 3.28 |
| $SiO_2$ Concentration in Sodium Silicate (% w/w) | 16.4 | 16.7 | 16.6 | 16.6 |
| Silicate volume (C) (liters) | 0.2 | 1.0 | 0.2 | 1.0 |
| Silicate Volume (D) (liters) | 20.2 | 103 | 19.8 | 93.7 |
| Acid Concentration (% w/w) | 18.6 | 17.6 | 18.3 | 17.8 |
| Acid Volume (F) (liters) | 6.8 | 39.4 | 7.0 | 34.0 |
| Temperature (E) (°C.) | 20 | 40 | 20 | 12 |
| Complexing agent | none | EDTA | none | none |

TABLE I

| SILICA N° | 1 | 2 | 3 | 4 |
|---|---|---|---|---|
| Oil Absorption ($cm^3/100$ g) | 260 | 235 | 330 | 300 |
| Mercury Intrusion Volume (ml/g) | 1.5 | 1.6 | 2.0 | 2.2 |
| Mean Pore Diameter (nm) | 9 | 8 | 8 | 8 |
| Surface Area ($m^2/g$): | | | | |
| total | 695 | 774 | 900 | 980 |
| pore diameter > 2 nm | 430 | 430 | 590 | 570 |
| Weight Mean Particle Size (micron) | 21 | 15 | 32 | 27 |
| Ignition Loss at 1000° C. (% w/w) | 9.1 13.0 | 9.0 | 9.8 | |
| Moisture Loss at | 2.6 | 7.3 | 2.5 | 3.8 |

TABLE I-continued

| SILICA N° | 1 | 2 | 3 | 4 |
|---|---|---|---|---|
| 105° C. (% w/w) | | | | |
| Total Fe (ppm w/w) | 320 | 350 | 340 | 300 |
| Releasable Fe (ppm w/w) | >80 | 8 | >80 | >80 |
| Electrolyte Level ($SO_4^=$) (% w/w) | 2.2 | 0.12 | 0.6 | 0.1 |
| Electrolyte Level ($Cl^-$) (% w/w) | 0.24 | 0.08 | 0.10 | 0.02 |
| pH | 5.8 | 5.4 | 6.0 | 7.0 |
| Bound Water (% w/w) | 6.5 | 5.7 | 6.5 | 6.0 |

In the following experiments the precipitated amorphous silicas obtained in the procedures summarized in table I and having the textural properties reviewed in table II, have been used in a physical refining process in order to determine the phosphorus and iron removal capacity in comparison to hydrogels according to the British patent application GB-2,168,373, commercially available precipitated silica Ultrasil VN3 ®, and bleaching earth Tonsil Optimum FF ®.

EXAMPLE II

Precipitated amorphous silicas according to the invention, prior art hydrogels, precipitated silica and the bleaching earth were used in a physical refining process, in which water degummed soybean oil (phosphorus content 147 mg/kg, iron content 1.30 mg/kg, water content 0.03 wt %) was heated to 90° C. 0.15 wt % citric acid solution (50 wt %) was added and the mixture was rapidly stirred during 15 minutes. Subsequently, 0.30 wt % water was added and stirring was continued for 15 minutes at 90° C. Thereafter, the mixture was cooled to 60° C. and the silica or bleaching earth was added in an amount indicated in table III. The suspension was slowly stirred for 90 minutes at 60° C., whereafter the solid material was removed by filtration. The results of the phosphorus and iron removal capacity on wet weight as well as on dry weight are indicated in Table III.

TABLE III

| Adsorbent | dosage (wt %) | P[1] (mg/kg) | Fe[1] (mg/kg) | P-removal per % adsorbent | |
|---|---|---|---|---|---|
| | | | | wet | dry |
| | | | | (mg/kg/% wt) | |
| Invention | | | | | |
| Silica N° | 0.75 | 34 | 0.58 | 151 | 166 |
| Silica N° | 0.75 | 27 | 0.72 | 160 | 184 |
| Silica N° | 0.75 | 1.8 | 0.02 | 194 | 214 |
| Prior art | | | | | |
| Trisyl TM [2] | 0.75 | 109 | 0.96 | 50 | 130 |
| Trisyl 300 TM [2] | 0.75 | 102 | 0.89 | 60 | 150 |
| Ultrasil VN3 TM [3] | 1.0 | 37 | 0.50 | 110 | 120 |
| Tonsil Optimum FF TM [4] | 0.75 | 102 | 1.65 | 60 | 65 |

[1] contents after filtration
[2] obtained from the Davison Chemical Division of W. R. Grace & Co; water contents approximately 60%-65%
[3] obtained from Degussa, total surface area about 250 m²/g
[4] obtained from Süd Chemie AG

EXAMPLE III

The precipitated amorphous silicas 3 and 4 according to the invention and a prior art hydrogel (Trisyl®) were used in a physical refining process, wherein water-degummed rapeseed oil (phosphorus content 75 mg/kg, iron content 1.00 mg/kg, water content 0.09 wt %) was heated to 90° C. 0.10 wt % citric acid solution (50 wt %) was added and this mixture was rapidly stirred during 15 minutes. Subsequently, 0.25 wt % water was added and stirring was continued for 15 minutes at 90° C. Thereafter, the mixture was cooled to 60° C. and the silica was added in an amount indicated in Table IV. The suspension formed was slowly stirred for 90 minutes at 60° C., whereafter the solids were removed by filtration. The results of the phosphorus and iron removal capacity on wet weight as well as on dry weight are indicated in Table IV.

TABLE IV

| Adsorbent | dosage (wt %) | P[1] (mg/kg) | Fe[1] (mg/kg) | P-removal per % adsorbent | |
|---|---|---|---|---|---|
| | | | | wet | dry |
| | | | | wet (mg/kg/% wt) | dry |
| Silica N° 3 | 0.60 | <1.0 | <0.01 | >125 | >135 |
| Silica N° 4 | 0.35 | 2.1 | 0.01 | 210 | 240 |
| Trisyl TM [2] | 0.75 | 28 | 0.55 | 65 | 170 |

[1] contents after filtration
[2] obtained from the Davison Chemical Division of W. R. Grace & Co; water contents approximately 60%-65%

We claim:

1. A process for refining glyceride oil comprising the steps of contacting the oil with amorphous silica, characterized in that said silica is selected from the group of precipitated amorphous silicas having a surface area of at least about 400 m²/g to 750 m²/g in pores with a diameter from at least 2 nm, said silica having a pore volume in the range of about 1.3 to 2.5 ml/g, in pores having a pore diameter in the range of 3.6 to 1000 nm.

2. A process according to claim 1, wherein said precipitated amorphous silicas have a surface area in the range of about 500 to 750 m²/g in pores with a diameter from at least 2 nm.

3. A process according to claim 2, wherein said precipitated amorphous silicas have a surface area in the range of about 550 to 750 m²/g in pores with a diameter from at least 2 nm.

4. A process according to claim 1, wherein said precipitated amorphous silicas have a pore volume in the range of about 1.5 to 2.5 ml/g, in pores having a pore diameter in the range of 3.6 to 1000 nm.

5. A process according to claim 4, wherein said precipitated amorphous silicas have a pore volume in the range of about 1.5 to 2.3 ml/g, in pores having a pore diameter in the range of 3.6 to 1000 nm.

6. A process according to claim 1, wherein said precipitated amorphous silicas have an average particle size in the range of about 10 to 40 μm.

7. A process according to claim 6, wherein said precipitated amorphous silicas have an average particle size in the range of about 15 to 35 μm.

8. A process according to claim 1, wherein said precipitated amorphous silicas have a mean pore diameter in the range of about 5 to 15 nm.

9. A process according to claim 8, wherein said precipitated amorphous silicas have a mean pore diameter in the range of about 5 to 10 nm.

10. A process according to claim 1, wherein said precipitated amorphous silicas have an oil absorption in the range of about 220 to 350 ml/g.

11. A process according to claim 1, wherein said precipitated amorphous silicas have a free moisture content of less than 20% w/w.

12. A process according to claim 1, wherein said precipitated amorphous silicas have an oil-releasable iron content of less than 20 ppm representing less than 30%, preferably less than 10% of the total iron content.

* * * * *